United States Patent Office.

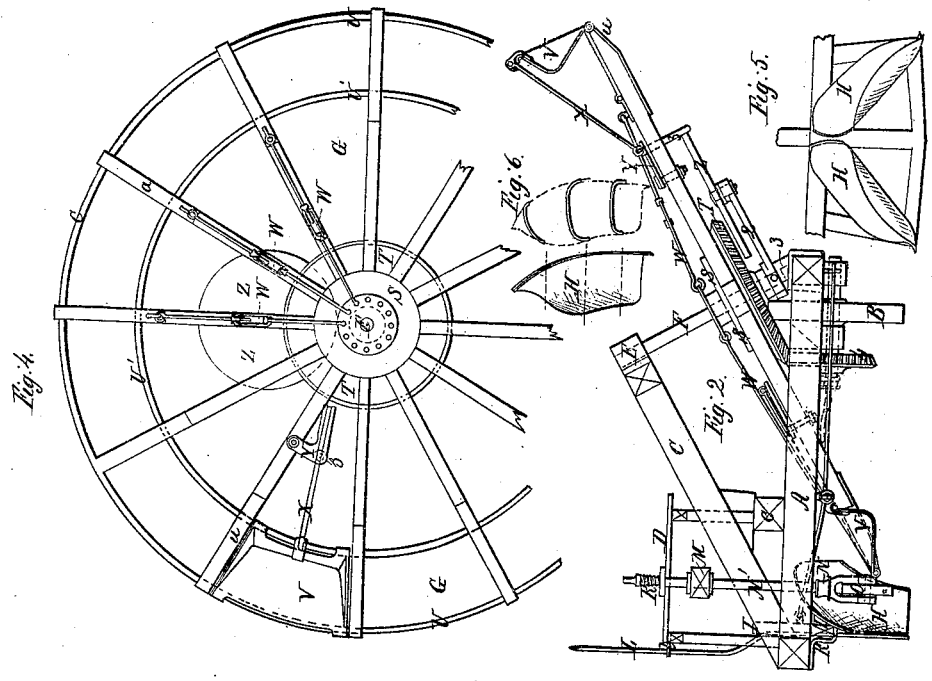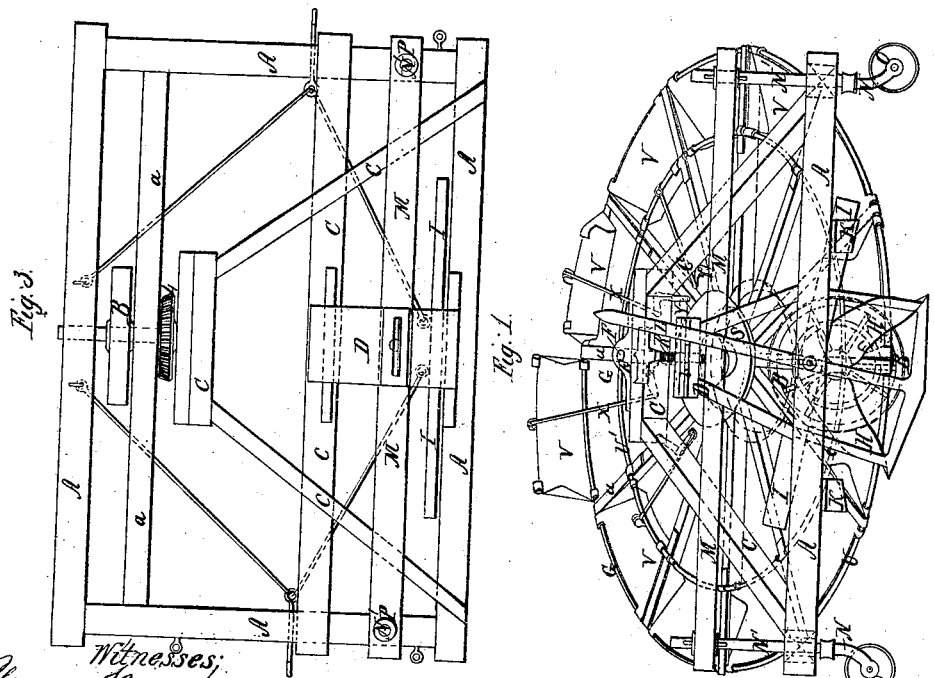

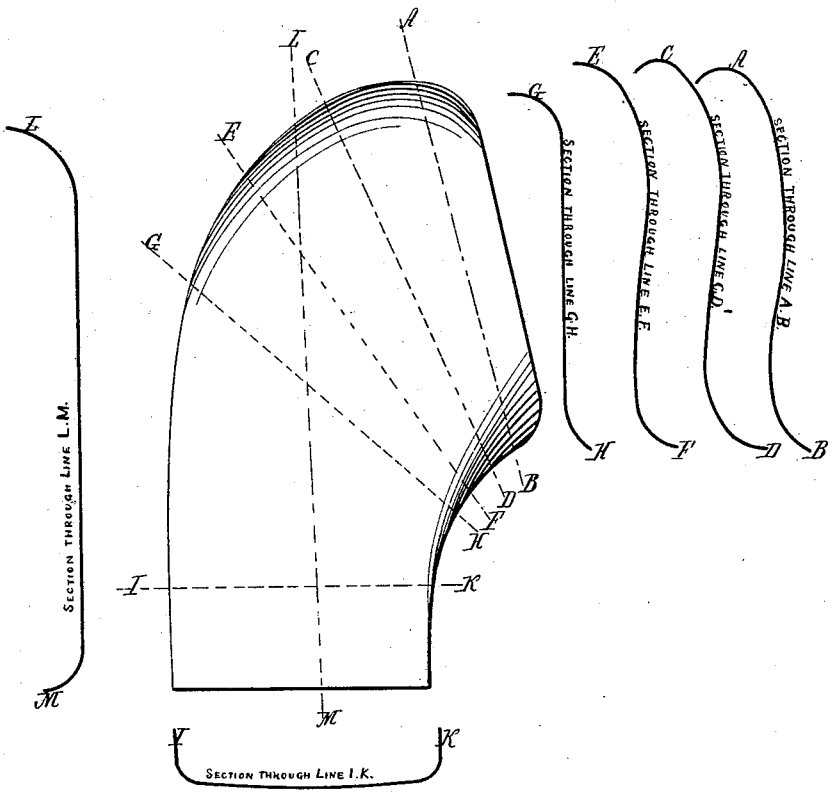

ALFRED EDDY PIERCE, OF GILROY, CALIFORNIA.

Letters Patent No. 96,724, dated November 9, 1869.

IMPROVED EXCAVATOR.

The Schedule referred to in these Letters Patent and making part of the same.

*To all whom it may concern:*

Be it known that I, ALFRED EDDY PIERCE, of Gilroy, Santa Clara county, State of California, have invented a certain new and improved "Excavating-Machine;" and I do hereby declare that the following is a full, clear, and exact description of the same, reference being had to the accompanying drawings, and letters of reference marked thereon, making a part of this specification, in which, on Sheet No. 1—

Figure 1 is a side view;

Figure 2 is a front view, with the conveyer-wheel partly in section;

Figure 3 is a plan of framing; and

Figure 4 is a plan of conveyer-wheel; and on Sheet No. 2, I show a detail drawing of my scoop or plow-point, with section-lines, taken at several different points.

To enable others skilled in the art to make and use my invention, I will proceed to describe its construction and operation, as follows:

My invention is intended principally for a ditching and embanking-machine, and will operate in such loose sands and soils as may be suited to its capacity.

It will also be used in grading and road-making, and will be found useful to operate in most of the cases where hand-labor with the pick and shovel is applied.

First I will, in general terms, describe its principle of construction and action, that the description of parts afterward made in detail may be the more readily understood.

I operate, in plowing or scooping up the soil, with a peculiarly-shaped plow or scoop, which, when dragged through the ground, carries the soil upward on its surface, until it reaches a certain point, where, by reason of the peculiar curvature given to what is called the "mould-board" of this plow, it is dumped or falls off on one side.

Just at this point where the soil is discharged from the plow, an inclined conveyer-wheel, having a series of swinging buckets distributed around its periphery, inserts its lower edge a trifle under the overhanging lip of the plow, in such a position as that when the soil is discharged, it will fall into one or more of these buckets.

Now this conveyer-wheel, when the machine moves forward, is made to revolve by being geared with a traction driving-wheel, and, because it is set "inclined," the buckets at its periphery will have alternate elevation and depression, their contents being carried up from the plow, near the ground, to a greater or less elevation, as well as proportional horizontal distance from the furrow being cut, accordingly as the machine may be proportioned, where, by a peculiar mechanical contrivance, to be hereinafter described, these buckets are gradually "tipped over," and their contents discharged in a regular and precise manner.

The whole of the parts are arranged and secured in a suitable frame-work, and the machine is dragged forward by horses, controlled by a driver.

I will now describe my machine and its parts in detail.

I construct a frame-work, A, of, say, four-by-eight timber, as shown in plan, fig. 3, well braced and bolted together, so as to attain proper strength and durability.

There will be an inside timber, *a*, running lengthwise, to which the bearing for the axle of the traction driving-wheel B will be attached, and another timber, *c*, setting on the main frame, serves as a support for the overhanging braces C, and the inside standards of the driver's seat D.

The overhanging braces C will consist of two timbers, stretching from two corners of the main frame, and joined by a cap at a point convenient to receive the upper bearing E for the shaft F of the conveyer-wheel G.

The feet of these overhanging braces must be well secured, by straps and bolts, to the main frame, and between the legs of these braces and the cross-timber *c* there will be wedges inserted, as shown in fig. 2.

My plows H will be made of iron, and of a certain peculiar shape, difficult to properly delineate in the drawing, but which will be readily understood by the following description:

The plow will have a flat "mould-board," or nearly so, and from its point, skirting both sides of the mould-board, there will be provided upturned flanges, to guide the soil in its passage up the surface of the plow, and to keep it from falling over the edges.

From a point a few inches up the mould-board, the outside flange will be made to gradually curl over in direction of the inner edge, in such manner as to crowd the soil over, as it were, to that side.

The opposing flange or lip of the plow will, on the inner side, curl downward, at just above the lowest bucket in the conveyer-wheel, in such a manner as that when, as the machine is dragged forward, the soil is forced upward on the surface of the plow, it will be guided to have discharge at just this point.

The precise curvature to be given these flanges or lips of the plow, may be a matter of variation, and will, in a measure, depend upon the relative proportions of the machine.

I propose to use two of these plows on some or all of my machines, although a single plow may be found to answer well.

These double plows, as is shown in fig. 1, will be set pointing in opposite directions, and will be arranged and operated in such a manner as to permit the machine to be worked back or forth, without it being necessary to turn it around.

The plows will be attached to the plow-beam I by suitable braces, so as to be perfectly rigid, and they will set in such relative position, one with the other, as that when one is engaged, the other will swing clear of the ground.

The plow-beam will be pivoted on a stout bolt or pin, $i$, fig. 1, running through the side-timber of the main frame, and two stops or rests K will be secured, at proper points, to this side-timber, to receive the downward end of the plow-beam, the object of these stops or rests being to prevent the plow-beam from swinging below a proper point, when the machine is operating, and thus the "dip" of the plows is controlled.

A stout hand-lever, L, will extend upward from this plow-beam to where it will be convenient for the driver to handle.

This lever may form a continuation of the centre-brace of the plow, and the pin $i$ may pass through it, in manner as is shown in fig. 1.

By this lever the driver will swing the plow-beam and the plows attached.

There will be a stop, $l$, secured to the frame of the driver's seat, with a notch in its centre, simply a flat piece of iron, inserted between the plank and frame of the driver's seat.

When the lever is in an upright position, it will set in the notch, and be held firmly in that position, and both plows will be inoperative.

A pin, run through a hole in the lever and the frame of the driver's seat, would also be a convenient means of holding this lever.

To raise my plows both clear of the ground, it is necessary that the side of the frame to which they are attached should be raised a few inches. The manner of accomplishing this is as follows:

I provide the spring-beam M, extending from end to end of the machine, and passing under the driver's seat. Secured to this beam, at each end, is the shaft or stem which forms the continuation of the bifurcated irons N, which carry the axles of the supporting-wheels O.

The manner of securing this stem to the spring-beam may be by running the stem through the beam, and keying the stem above and below, washers being placed between the keys and the beam.

In this manner I have shown it in figs. 1 and 2 of my drawing, but other means may be adopted.

The stems N will pass freely through the cross-timbers of the frame, and a metal thimble or socket, P, set in the wood, and through which the stem will work, will serve to prevent this stem from wearing away the timber.

At the middle of this spring-beam, and passing through about the middle of the driver's seat, will be the vertical screw R.

There will be a metal nut firmly fastened to the driver's seat, for its reception, and on the spring-beam will be fastened a small metal wearing-plate or step, which will receive the point of the screw.

A cross-bar, crank-handle, or hand-wheel, secured to the head of this screw, will serve as a means of handling it.

Now, it will easily be perceived that if this screw is screwed down on the spring-beam, because this beam is bearing on the ground by the wheels O, the driver's seat, and the frame to which it is attached, must be raised up, and thus the plows will be cleared of the ground, when it is desired to drag forward the machine when not in operation.

The carrying-wheels may be metal or wooden wheels, of small diameter, revolving on axles set in bifurcated irons, as shown in figs. 1 and 2, being similar in principle of construction to the common caster-wheel, as used on furniture.

The conveyer-wheel G is of peculiar and novel construction, and principally in its parts does my invention consist.

It is formed of a series of, say, twelve (more or less) wooden spokes, bolted to and radiating from a central flange, S.

This flange may be part of the driving bevel-wheel T; that is to say, the spokes may be fastened to this bevel-wheel. These spokes will be of such length as to make the wheel, say, fourteen feet diameter, more or less.

To the extreme point of these spokes, the ring of round bar-iron U will be strapped by the straps $u$. (See figs. 1, 2, and 4.)

To this ring all the buckets V will be hinged.

About a foot or more inside of this outer ring, there will be another similar one, U', which, resting on the spokes, will be fastened to them by the straps $u$, before mentioned.

There will be an annular space between the inner and outer rings, intersected by each of the radiating arms. This space will be occupied by the buckets, which will be made out of sheet-iron, of shape as shown in figs. 1 and 2. The buckets will, as before mentioned, hinge on the outer ring, and will, by little hooks secured to their backs, rest on the inner ring when not being tipped over.

The conveyer-wheel will be thoroughly braced by the turn-buckle bolts or "hog-chains" W, (one for each spoke,) which attach to the hub of the centre flange, and an eye-bolt, set in the spokes at near the end. (See figs. 2 and 4.)

Now, I have designed (another important part of my invention) a peculiar arrangement for tipping over the buckets, which I will thus describe:

I attach the rods X in the middle of the back part of each bucket, by a pin, passing through an eye-strap, which is secured to the bucket, or in any other way which will admit of the vibration of the rods.

These rods will, in a similar way, have their other ends attached to a series of links or "bell-cranks," Y, which will be pivoted at about the middle of each spoke.

From this bell-crank will be projected downward a stem, $z$, which will be so arranged as to come in contact with the wheel Z every time a revolution is made, to the extent that the bell-cranks may be swung around, the rods X pushed forward, and the buckets "tipped" upward sufficiently to discharge their contents.

The wheel Z will revolve loosely on a pin set in the end of the arm 2, which extends out from, and which is secured to the step 3, which supports the shaft of the conveyer-wheel.

This arm 2 is held to step by a set-screw, and may, with the attached wheel Z, be swung around to any desired position, and in this way, the point at which the buckets shall be discharged may be regulated.

I will drive my conveyer-wheel, by placing a bevel-pinion, 4, on the inner end of the axle of the traction driving-wheel B, which shall gear with the bevel-wheel on the conveyer-wheel shaft.

I may, if I choose, make this pinion to revolve free of the axle, and bring it into engagement by using a jaw-clutch, sliding on a "feather" on the axle, and operated by a hand-lever, a device well understood by those practised in the art. By using this clutch, I shall be able to stop the revolution of my conveyer-wheel, when it may be desired.

I have shown this clutch in dotted lines in fig. 2, which, though not absolutely necessary, may be convenient to adopt.

In figs. 2 and 3, I have shown my draught-irons, which are simply rods or links, attaching, by eye-bolts, on one side to the frame, and on the other side to the plow-beam. Two eye-bolts are also provided at each end of the frame, to which the "tongue" (not shown in drawing) will be attached. Thus, a double attachment may be made of the power applied to drag the machine, and a too great strain on any one part be avoided.

The operation of my machine is as follows:

Horses are attached to either end, and drag forward the machine. The plows scoop up the soil, and deliver it into the buckets of the conveyer-wheel, which, revolving with the traction-wheel, to which it is geared, brings the loaded buckets up from the plow, which fills them to any desired elevation within the capacity of the conveyer-wheel. These buckets are then, by reason of the projecting stem of the bell-crank coming in contact with wheel or disk Z, tipped upward and over, with some force, and their contents discharged, in a continuous manner, to some distance from the machine.

When it is desired to change the direction of the machine, as, for instance, to go backward, the hand-lever of the plow-beam is set over to its opposite side, which lifts one plow out of the ground, and inserts the other into the ground. The horses being changed around to the other end of the machine, it may then be driven in the opposite direction.

When the machine is to be dragged along without operating, both plows may be raised from the ground by screwing down the screw R, which raises one side of the machine, as before suggested; and when the machine is so arranged, the clutch, which engages with the bevel-pinion 4, may be thrown out of gear, and then the conveyer-wheel will cease to revolve.

I will here remark, that I am aware of the principle of an inclined wheel having been used on excavating-machines, and therefore I will not claim the inclined conveyer-wheel, broadly, as a principle employed to elevate dirt; but I am not aware of any excavating-machine having an elevating conveyer-wheel, having the parts constructed, and arranged, and operated in manner as in this of my invention.

Again, though I am aware that plows have been used to deliver the soil upon conveyer-wheels, still, I know of no plow having been constructed as is this of my invention, and operating, first, to elevate the soil, and then discharge it on one side. Therefore,

What I claim as my invention, and desire to secure by Letters Patent, is—

1. The tipping-buckets V, in combination with the outside ring U, on which they hinge, and the inside ring U', on which they rest, these rings being secured, by straps, or otherwise, to the radiating arms, for the purposes as set forth, and substantially as herein described.

2. The combination of the rods X, attached to the back of the buckets, the bell-crank Y, with the projecting stem z and the adjustable revolving disk or wheel Z, for the purposes as set forth, and constructed and arranged substantially as herein described.

3. The spring-beam M, to which my carrying-wheels O are attached, in combination with the screw R, for the purpose as set forth, and arranged substantially as described.

4. The shape given the mould-board of the plow, with its guiding side-flanges, for the purposes as set forth, and constructed substantially as herein described.

ALFRED EDDY PIERCE.

Witnesses:
GEORGE PARDY,
JOHN PARDY.